Patented Oct. 24, 1922.

1,432,859

UNITED STATES PATENT OFFICE.

HARRY HEY, OF MELBOURNE, VICTORIA, AUSTRALIA.

RECOVERY OF LEAD AND SILVER FROM SULPHIDE ORES AND METALLURGICAL PRODUCTS.

No Drawing.  Application filed September 16, 1920. Serial No. 410,754.

*To all whom it may concern:*

Be it known that I, HARRY HEY, a subject of the King of Great Britain, residing at Collins House, 360–366 Collins Street, Melbourne, in the State of Victoria, Commonwealth of Australia, have invented certain new and useful Improvements in the Recovery of Lead and Silver from Sulphide Ores and Metallurgical Products, of which the following is a specification.

This invention relates to the extraction of lead and silver from sulphide ores and metallurgical products and refers more particularly to sulphide ores containing lead and silver and zinc such as those of Broken Hill.

The process forming the subject matter of this invention is applicable to concentrates, slimes, tailings and the like as well as to ores and the term "ores" is to be held to include such products.

In the recovery of lead and silver from ores of this character, it has been proposed to subject the said ores to such treatment that a preferential chloridizing of the lead and silver is effected and subsequently leaching out, either separately or together, the chlorides of lead and silver leaving residues containing the zinc substantially free from lead and silver.

One of the known methods of effecting this preferential chloridizing of the lead and silver contained in mixed ores (such as Broken Hill ores) has been to mix the said ores with a certain quantity of zinc chloride and heat the mixture without access of air in a closed vessel. The extraction of the lead and silver chlorides from the chloridized product has been effected by leaching with a cold solution (such as brine or sodium thiosulphate) taking precautions to prevent the reversion of the chlorides to sulphides such as by working under conditions that the contact between the ore and the solution was reduced to a minimum or alternatively with a brine solution containing a substance which has a chloridizing effect (such as ferric chloride). When it was desired to extract the lead separately from the silver the chloridized product was first leached with a solution (such as hot concentrated brine) containing a small proportion of zinc chloride and then subsequently extracting the silver by leaching with a brine solution containing a small percentage of ferric chloride.

To obtain an increased extraction of lead and silver it has also been proposed to first leach the chloridized product with a cold brine solution containing a little ferric chloride whereby the silver is extracted, and then to leach the residues with a hot brine whereby the lead is extracted. This latter process is the subject of application No. 11139/19 in the Commonwealth of Australia.

The object of the present invention is to provide certain modifications in the aforesaid leaching operations whereby the lead and silver are more readily extracted from the chloridized products.

I accomplish this object by first subjecting the ore to a preferential chloridizing treatment (such as by furnacing with zinc chlorid without access of air) and then leaching first with acidulated cold brine solution for the extraction of the silver and then with a hot brine solution for the extraction of the lead.

In one application of this invention the ore is first chloridized by furnacing with zinc chloride in the usual manner and the excess of zinc chloride is then leached out with cold water preferably acidulated with hydrochloric acid. The chloridized product so obtained is then leached with cold brine solution containing a small proportion of hydrochloric acid for the purpose of dissolving out practically the whole of the silver and leaving a residue from which the lead is dissolved by a hot brine solution.

The cold brine (acidified with hydrochloric acid) used for extracting the silver would ordinarily be saturated with lead chloride. In such a case no lead would be extracted from the product during the treatment for the extraction of the silver. In some cases, however, such as at the commencement of operations, it may be convenient to leach with cold brine acidified with hydrochloric acid but not saturated with lead chloride and the leaching solution may be allowed to dissolve the lead chloride to saturation for use in subsequent operations.

In some cases it may be desirable to remove part of the lead contents of the ore with the silver.

Instead of leaching by percolation it may be more convenient in some cases to agitate the chloridized ore with the solution and remove the supernatent liquor by decantation after the settlement of the solids.

The following examples will illustrate some applications of this invention.

Example I.

3000 grms. of a zinc concentrate containing eight ounces of silver per ton and six per cent of lead were mixed with an amount of zinc chloride being 33% in excess of that theoretically required to chloridize these metals and the mixture was furnaced in a continuously operated air sealed chamber. The chloridized product was then charged into a vat where it formed a three foot bed and was then washed with cold water to dissolve out excess zinc chloride, the water being acidified with hydrochloric acid. The material was then leached with 6000 ccms. of a cold solution containing 24% of sodium chloride and 3 ccs. of commercial hydrochloric acid per litre. This leaching removed the major portion of the silver, the residue containing only .8 ozs. per ton. The material was then leached with a hot neutral brine to extract the lead with the result that a final residue was obtained practically free from lead.

Example II.

1000 grammes of an ore from another locality containing 21.6% Pb, 31.9% Zn, and 16.6 ozs. Ag per ton after having been submitted to a chloridizing furnacing treatment was allowed to stand for two days and then leached by percolation through a twelve inch bed with 1600 ccs. of a cold brine solution containing 30 ccs. commercial hydrochloric acid per litre. This solution also contained lead chloride to saturation. After removal of the solution the residue was treated by percolation with a neutral brine solution heated to between 90° and 95° C. The residual ore contained 1.8 ozs. Ag and 0.4% Pb.

Example III.

300 lbs. of granular Broken Hill concentrates containing 6% Pb, 7.7 ozs. Ag, and 48% Zn, after a chloridizing furnacing treatment were leached by percolation through a three foot bed with the following solutions in the order set out:— a. 10 gals. of cold water containing 0.013 lbs. absolute HCl per gal. (1.3 grams per litre.)

b. 60 gals cold brine solution (24% NaCl) containing $PbCl_2$ and 0.03 lbs. absolute HCl per gal.

c. 60 gals of neutral brine solution (24% NaCl) at 90° C.

d. 10 gals. of water.

The residual ore contained 0.4 ozs. Ag, 0.1% lead and 52% Zn.

Example IV.

A series of 66 charges comprising in all approximately 9 tons were leached in a similar manner to that set out in Example III, the two brine solutions being cycled 20 times. The silver was removed by precipitation with zinc dust between each cycle and the lead was removed by crystallization on cooling. The residual ore averaged 0.21% lead, and 0.7 ozs. Ag. and 52% Zn.

Though the examples of this invention have been described as applied to chloridized products obtained by the method of operation indicated, viz, by furnacing with zinc chloride, it will be understood that the invention is also applicable to products in which similar preferential chloridizing of the lead and silver has been effected in other ways.

I claim:

1. In the recovery of lead and silver from sulphide ores which have been subjected to a preferential chloridizing treatment for the chloridizing of the lead and silver, first leaching the chloridized material with acidulated cold brine solution for the extraction of the silver and then leaching with a solution that will extract substantially the whole of the remaining lead from the silver free residue.

2. In the recovery of lead and silver from sulphide ores which have been subjected to a preferential chloridizing treatment for the chloridizing of the lead and silver, first leaching the chloridized material with a cold brine solution acidified with hydrochloric acid and saturated with lead chloride for extracting the silver and then leaching with a solution that will extract substantially the whole of the remaining lead from the silver free residue.

3. In the recovery of lead and silver from sulphide ores which have been subjected to a preferential chloridizing treatment for the chloridizing of the lead and silver, first leaching the chloridized material with a cold brine solution acidified with hydrochloric acid and saturated with lead chloride for the extraction of the silver and then leaching with a hot brine solution for the extraction of the lead from the silver free residue.

4. In the recovery of lead and silver from sulphide ores a process comprising mixing the ores with sufficient zinc chloride to chloridize the lead and silver present heating the mixture without access of air at a temperature sufficiently high to chloridize the material then leaching with cold brine solution acidified with hydrochloric acid for the extraction of the silver and finally leaching with a hot brine solution for the extraction of the lead.

5. In the recovery of lead and silver from sulphide ores, a process comprising mixing the ores with sufficient zinc chloride to chloridize the lead and silver present, heating the mixture without access of air at a temperature sufficiently high to chloridize the material and then leaching with a solution for the extraction of the silver consisting of cold brine acidified with hydrochloric acid containing lead chloride and finally leaching with a solution for the extraction of the lead consisting of hot neutral brine.

In testimony whereof I have signed my name to this specification in the presence of two subscribing witnesses.

HARRY HEY.

Witnesses:
G. L. CULLEY,
BERTHA R. CLARKE.